US008131900B2

(12) United States Patent
Takehara et al.

(10) Patent No.: US 8,131,900 B2
(45) Date of Patent: Mar. 6, 2012

(54) BUS SIGNAL CONTROL CIRCUIT FOR DETECTING BUS SIGNAL ABNORMALITIES USING SEPARATE BUS DIAGNOSIS LINE

(75) Inventors: Jun Takehara, Tokyo (JP); Naruhiko Aramaki, Tachikawa (JP); Toshikazu Kawamura, Kunitachi (JP); Yoshito Sameda, Yokohama (JP); Hiroshi Nakatani, Tama (JP); Motohiko Okabe, Fuchu (JP); Yukitaka Yoshida, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 12/432,896

(22) Filed: Apr. 30, 2009

(65) Prior Publication Data

US 2009/0287867 A1 Nov. 19, 2009

(30) Foreign Application Priority Data

May 19, 2008 (JP) .................................. 2008-130475

(51) Int. Cl.
*G06F 13/00* (2006.01)
*H04L 1/14* (2006.01)
(52) U.S. Cl. ........................................ 710/110; 714/750
(58) Field of Classification Search .................. 710/110; 714/750
See application file for complete search history.

(56) References Cited

U.S. PATENT DOCUMENTS

| 3,555,517 | A | | 1/1971 | Heath, Jr. et al. | |
|---|---|---|---|---|---|
| 4,347,609 | A | * | 8/1982 | Fukuyama et al. | 714/750 |
| 4,845,351 | A | * | 7/1989 | Hara et al. | 235/492 |
| 4,956,770 | A | * | 9/1990 | Johnson et al. | 712/220 |
| 5,005,174 | A | * | 4/1991 | Bruckert et al. | 714/11 |
| 5,428,753 | A | * | 6/1995 | Kondo et al. | 710/107 |
| 5,590,292 | A | * | 12/1996 | Wooten et al. | 710/5 |
| 5,604,874 | A | * | 2/1997 | Kondo et al. | 710/118 |
| 5,655,082 | A | * | 8/1997 | Umekita et al. | 709/213 |
| 6,216,236 | B1 | * | 4/2001 | Miyao et al. | 714/11 |
| 7,224,181 | B1 | * | 5/2007 | Schmit et al. | 326/38 |

(Continued)

FOREIGN PATENT DOCUMENTS

DE    42 12 742 A1    10/1993

(Continued)

OTHER PUBLICATIONS

"NN941095: Data Stream Queue to Simulate Contention Error Capability", Oct. 1, 1994, IBM, IBM Technical Disclosure Bulletin, vol. 37, Iss. 10, pp. 95-96.*

(Continued)

*Primary Examiner* — Faisal M Zaman
(74) *Attorney, Agent, or Firm* — Oblon, Spivak, McClelland, Maier & Neustadt, L.L.P.

(57) ABSTRACT

A memory control unit controls writing and reading of data to the slave device according to an instruction from the master device. A bus diagnosis line is directly connected from the bus signal control circuit to a bus signal receiving terminal of the slave device without passing through the address bus and the control signal line. A bus signal abnormality processing unit compares an output bus signal output from the bus signal control circuit to the address bus and the control signal line with a feedback bus signal fed back through the bus diagnosis line to determine the presence/absence of a difference. The memory control unit elongates a bus cycle period of a bus cycle of operation being executed when it is determined in the bus signal abnormality processing unit that the difference is present.

3 Claims, 10 Drawing Sheets

U.S. PATENT DOCUMENTS

| | | | |
|---|---|---|---|
| 7,268,586 B1 * | 9/2007 | Redgrave | 326/41 |
| 7,330,050 B2 * | 2/2008 | Redgrave | 326/38 |
| 7,406,632 B2 * | 7/2008 | Sealey et al. | 714/48 |
| 7,475,304 B1 * | 1/2009 | Kaufman et al. | 714/724 |
| 7,577,756 B2 * | 8/2009 | Teowee et al. | 709/238 |
| 7,872,964 B2 * | 1/2011 | Tanimoto et al. | 370/216 |
| 8,018,089 B2 * | 9/2011 | King et al. | 307/31 |
| 2002/0091976 A1 * | 7/2002 | Lee | 714/712 |
| 2003/0020549 A1 * | 1/2003 | Mukaide | 331/11 |
| 2004/0015765 A1 * | 1/2004 | Cooper et al. | 714/750 |
| 2004/0237001 A1 * | 11/2004 | Schulz et al. | 714/42 |
| 2005/0066258 A1 * | 3/2005 | Aoyama et al. | 714/785 |
| 2005/0081085 A1 * | 4/2005 | Ellis et al. | 714/5 |
| 2006/0139976 A1 | 6/2006 | Zambetti et al. | |
| 2006/0190780 A1 * | 8/2006 | Gower et al. | 714/718 |
| 2008/0046603 A1 * | 2/2008 | Kobayashi et al. | 710/17 |
| 2008/0125888 A1 * | 5/2008 | Marellapudi et al. | 700/90 |
| 2009/0158111 A1 * | 6/2009 | Johnson | 714/750 |
| 2010/0057959 A1 * | 3/2010 | Korrek | 710/110 |

FOREIGN PATENT DOCUMENTS

| | | | |
|---|---|---|---|
| JP | 62271153 A | * | 11/1987 |
| JP | 3-24601 | | 2/1991 |
| JP | 3-238551 | | 10/1991 |
| JP | 04105151 A | * | 4/1992 |
| JP | 11-45214 | | 2/1999 |
| JP | 11-167530 | | 6/1999 |
| JP | 11-242638 | | 9/1999 |
| JP | 2004222292 A | * | 8/2004 |
| JP | 2007-148592 | | 6/2007 |
| KR | 1989-0015533 | | 10/1989 |
| KR | 2002-0071297 | | 9/2002 |
| RU | 96106909 A | | 6/1998 |
| RU | 97105856 A | | 4/1999 |
| RU | 2295748 C2 | | 11/2006 |

OTHER PUBLICATIONS

"NN9401163: Mechanism for Capturing Failure Data within a Replaceable Machine Element", Jan. 1, 1994, IBM, IBM Technical Disclosure Bulletin, vol. 37, Iss. 1, pp. 163-164.*

"NN7806282: Synchronous Data Link Control Subset", Jun. 1, 1978, IBM, IBM Technical Disclosure Bulletin, vol. 21, Iss. 1, pp. 282-283.*

Yann-Chang Huang; Hong-Tzer Yang; Ching-Lien Huang; , "A new intelligent hierarchical fault diagnosis system [for power networks]," Power Systems, IEEE Transactions on , vol. 12, No. 1, pp. 349-356, Feb 1997.*

Korean Office Action issued Nov. 11, 2010, in Patent Application No. 10-2009-0043229 (with English-language translation).

Decision on Grant issued on Dec. 10, 2010, in Russia Patent Application No. 2009118689/08(025704) (with English Translation).

* cited by examiner

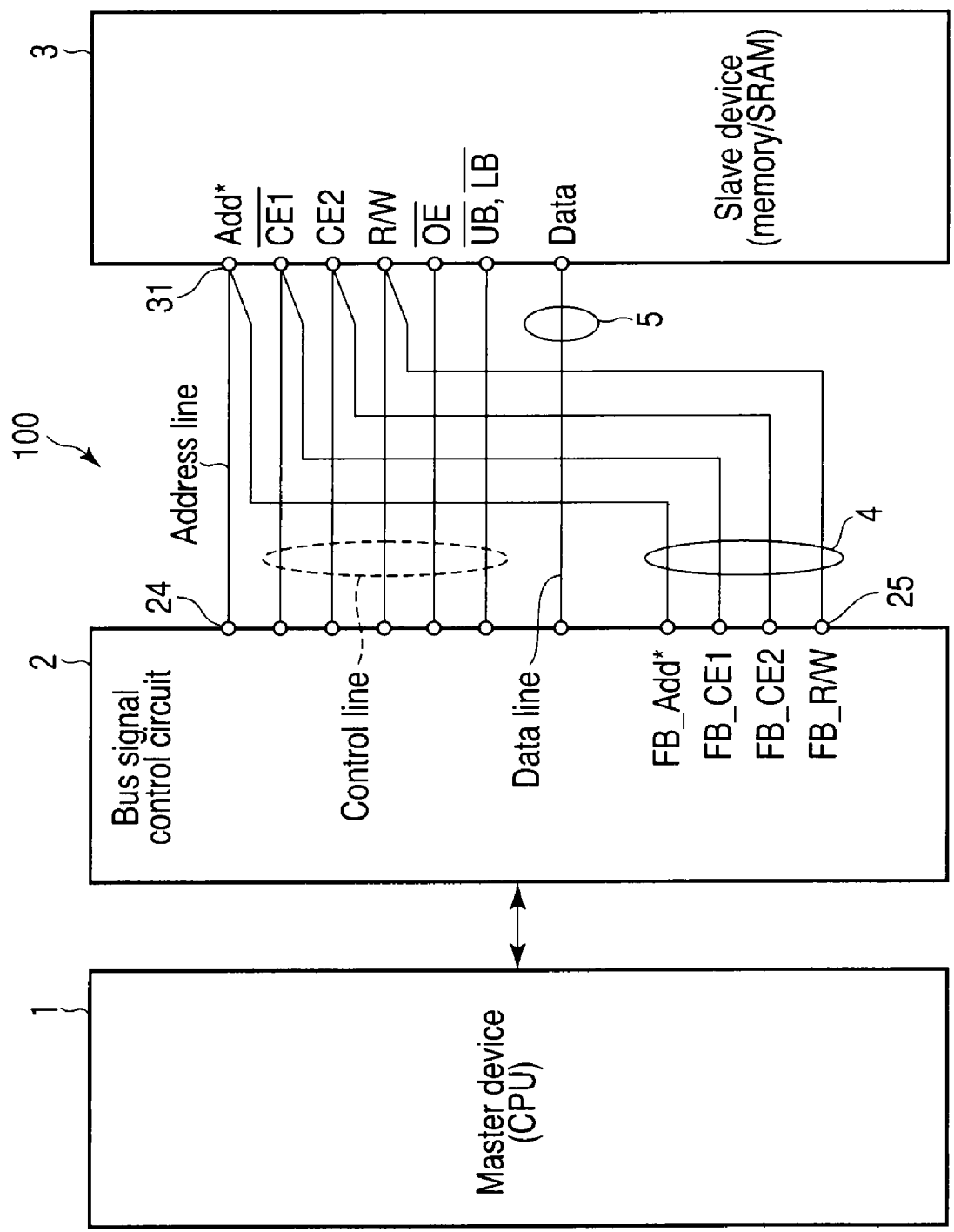
F I G. 2A

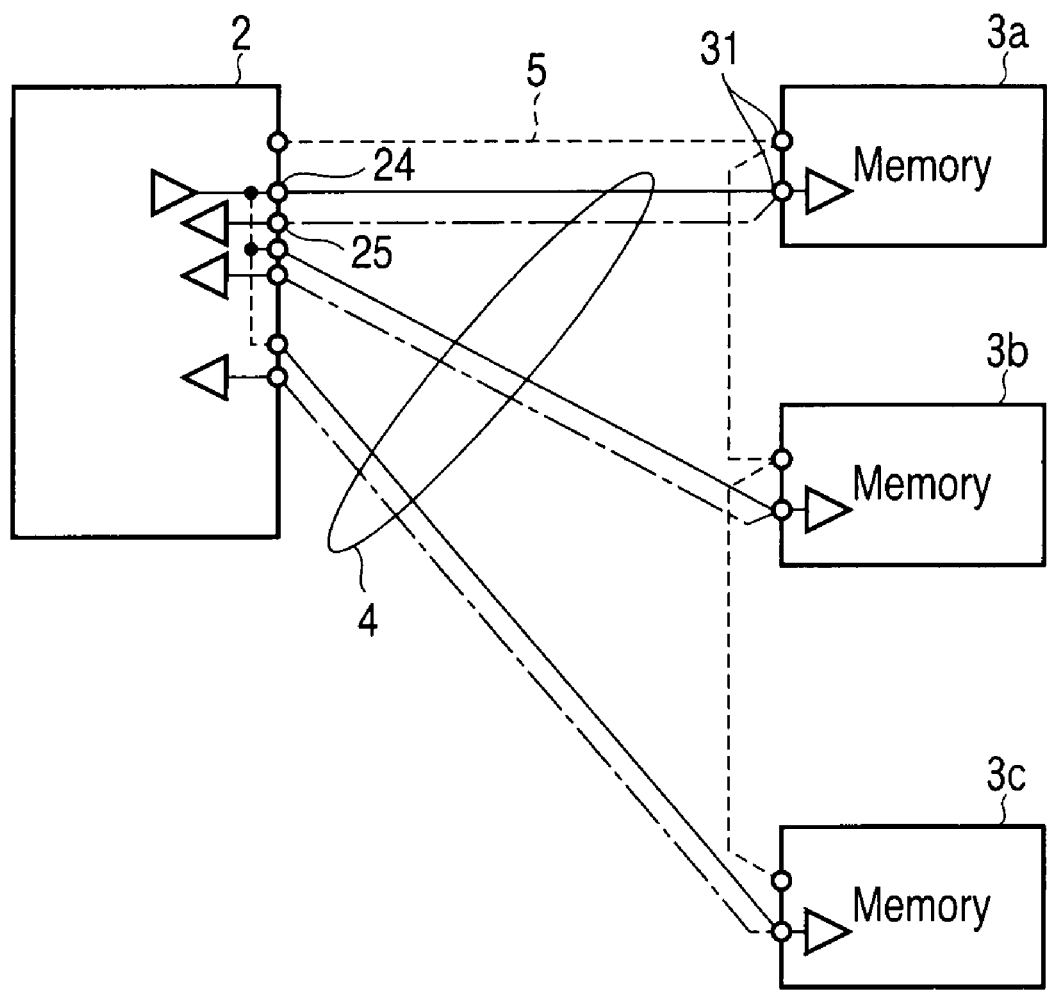
F I G. 2B

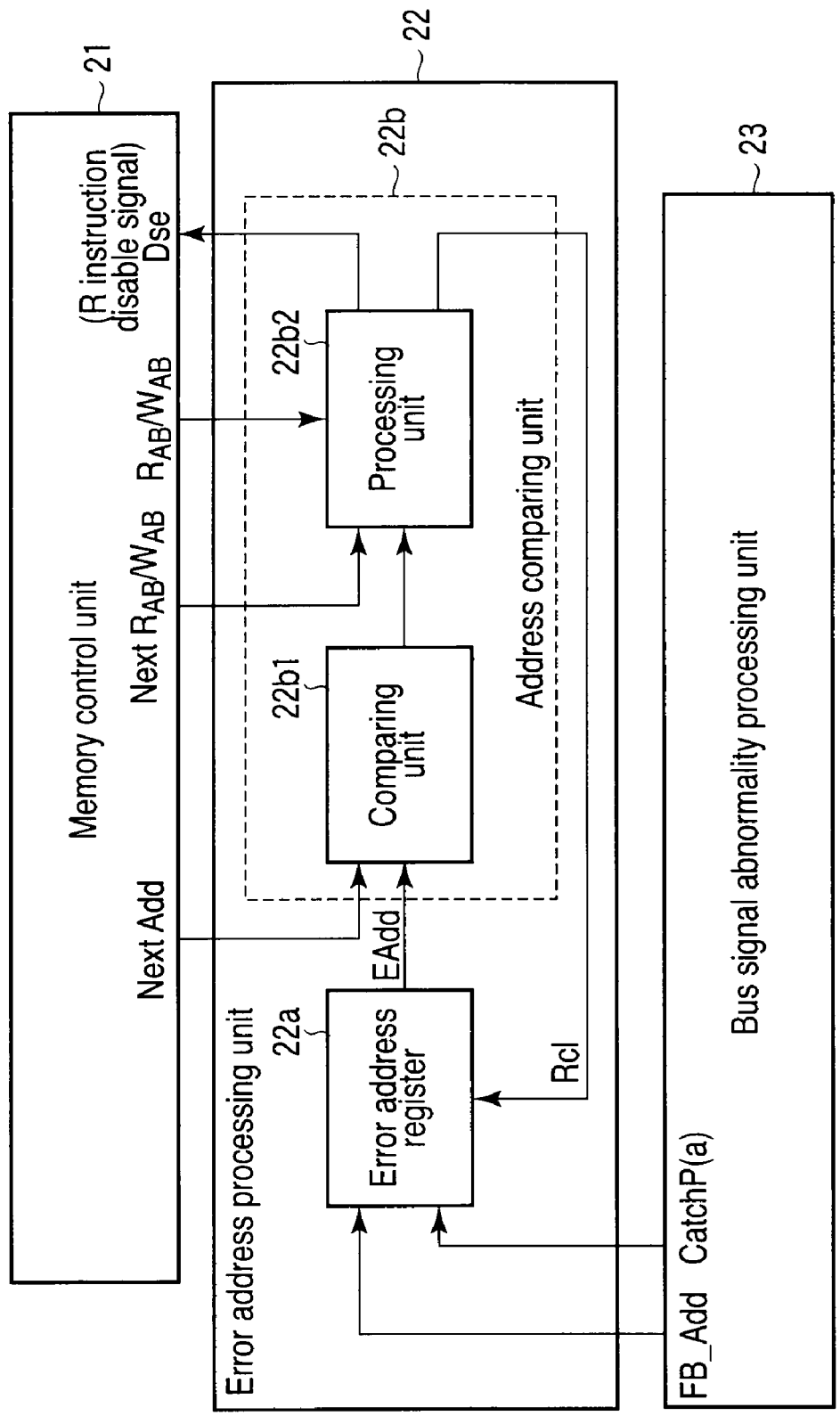
F I G. 8

BUS SIGNAL CONTROL CIRCUIT FOR DETECTING BUS SIGNAL ABNORMALITIES USING SEPARATE BUS DIAGNOSIS LINE

CROSS-REFERENCE TO RELATED APPLICATIONS

This application is based upon and claims the benefit of priority from prior Japanese Patent Application No. 2008-130475, filed May 19, 2008, the entire contents of which are incorporated herein by reference.

BACKGROUND OF THE INVENTION

1. Field of the Invention

The present invention relates to a bus signal control circuit which executes transmission and reception of data, an address, and a control signal between a master device such as a CPU and a slave circuit such as a storage circuit or an input/output circuit through a bus, and a signal processing circuit having the bus signal control circuit.

2. Description of the Related Art

In general, a microcomputer is configured by a CPU, a memory, and a peripheral I/O. At present, microcomputer devices are used in many fields, and an erroneous operation of the microcomputer device caused by an influence of surroundings seriously impacts on society. For this reason, as protection against an erroneous operation of a memory, various methods are provided.

Interface signal lines between a master device such as a CPU and a slave device such as a memory include bus signal lines such as an address bus and a data bus and control signal lines such as a chip enable line and a read/write line.

When a noise or the like is mixed with a signal on the signal lines, a data error or an address error occurs, so that the device may erroneously operate.

In general, as a countermeasure against the erroneous operations, error correction by adding a parity bit or an ECC is performed to data error. Error correction by adding a parity bit is also performed to an address error.

When a master device and a memory are physically separated from each other, for example, when printed circuit boards to be mounted are different from each other and wired by a motherboard, a parity bit is added by the master device, and parity check is performed after information of an address and data is temporarily stored (latched) on the board side on which the memory is mounted. In this case, there is employed a method which inhibits the memory from being accessed on the board side on which the memory is mounted when an address error is detected.

In general, the following method is also performed. That is, when an address error occurs, the same address is read more than once in response to read access, and it is confirmed whether read data are matched with each other to avoid data read from an erroneous address from being read.

Furthermore, in write access, desired address data may not be written. In this case, as a countermeasure against an erroneous operation, it is checked whether the desired address data can be normally written by reading back the written address data. A technique which causes a CPU to output an instruction to write data again if the desired data cannot be read back (read-back error) is disclosed in, for example, Jpn. Pat. Appln. KOKAI Publication No. 11-45214.

A technique which, even though a noise occurs in a bus signal by changing bit states of the bus signal at once, prevents the bus signal from being erroneously recognized by the influence of the noise is disclosed in Jpn. Pat. Appln. KOKAI Publication No. 11-167530. This technique is a signal control circuit technique which suppresses a noise causing an address error of a DRAM.

According to the technique, signals of two addresses continuously output from the signal control circuit to a dynamic RAM are compared with each other to delay a control signal. For this reason, the address signals can be read in a period except for a period in which a noise occurs. Therefore, it is described that an erroneous address can be prevented from being designated to a dynamic RAM.

However, in the address error handling disclosed in Jpn. Pat. Appln. KOKAI Publication No. 11-45214, in both cases, bus abnormality is detected by parity check or read back check. Information of the detected address error is temporarily stored in a memory and then processed by a CPU through an error handling process. Therefore, time corresponding to two steps or more is disadvantageously required for the error handling.

Furthermore, when a master device and a memory are physically separated from each other, address data transmitted from a master device (CPU) side may not be normally received by a slave device (memory) on a reception side. In this case, an address error occurs at an address at which data should be originally written, and the data is written at an erroneous address. In this case, the written data is disadvantageously latently present in the memory of the erroneous address.

According to Patent Document 2, although a bus noise which causes an address error is advantageously controlled, an address error caused by induction of an external noise cannot be controlled.

BRIEF SUMMARY OF THE INVENTION

The present invention has been made to solve the above problems, and an object of the invention is to provide a bus signal control circuit which can reliably detect an address error caused by a noise induced to a bus or control signal line of a signal processing circuit to make it possible to perform high-speed error handling and a signal processing circuit having the bus signal control circuit.

In order to achieve the above object, according to one embodiment of the present invention, there is provided a bus signal control circuit which is connected between a master device which controls transmission or reception of data and a slave device which stores the data, connected to the slave device through an address bus and a control signal line, and controls a bus signal transmitted or received through the address bus and the control signal line, comprising: a bus diagnosis line which is directly connected to a bus signal receiving terminal of the slave device without passing through the address bus and the control signal line; a memory control unit which controls writing and reading of data to the slave device according to an instruction from the master device; and a bus signal abnormality processing unit which compares an output bus signal output from the bus signal control circuit to the address bus and the control signal line with a feedback bus signal fed back through the bus diagnosis line to determine the presence/absence of a difference, wherein the memory control unit elongates a bus cycle period of operation being executed when it is determined in the bus signal abnormality processing unit that the difference is present.

According to the present invention, a bus signal control circuit which can reliably detect an address error caused by a noise induced to a bus of a signal processing circuit to make it possible to perform high-speed error handling, and a signal processing circuit having the signal control circuit can be provided.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 2A and 2B show embodiments of bus diagnosis lines of a signal processing circuit according to the present invention;

FIG. 8 is a diagram for explaining a configuration of an error address processing unit according to the present invention.

DETAILED DESCRIPTION OF THE INVENTION

Figure 1:
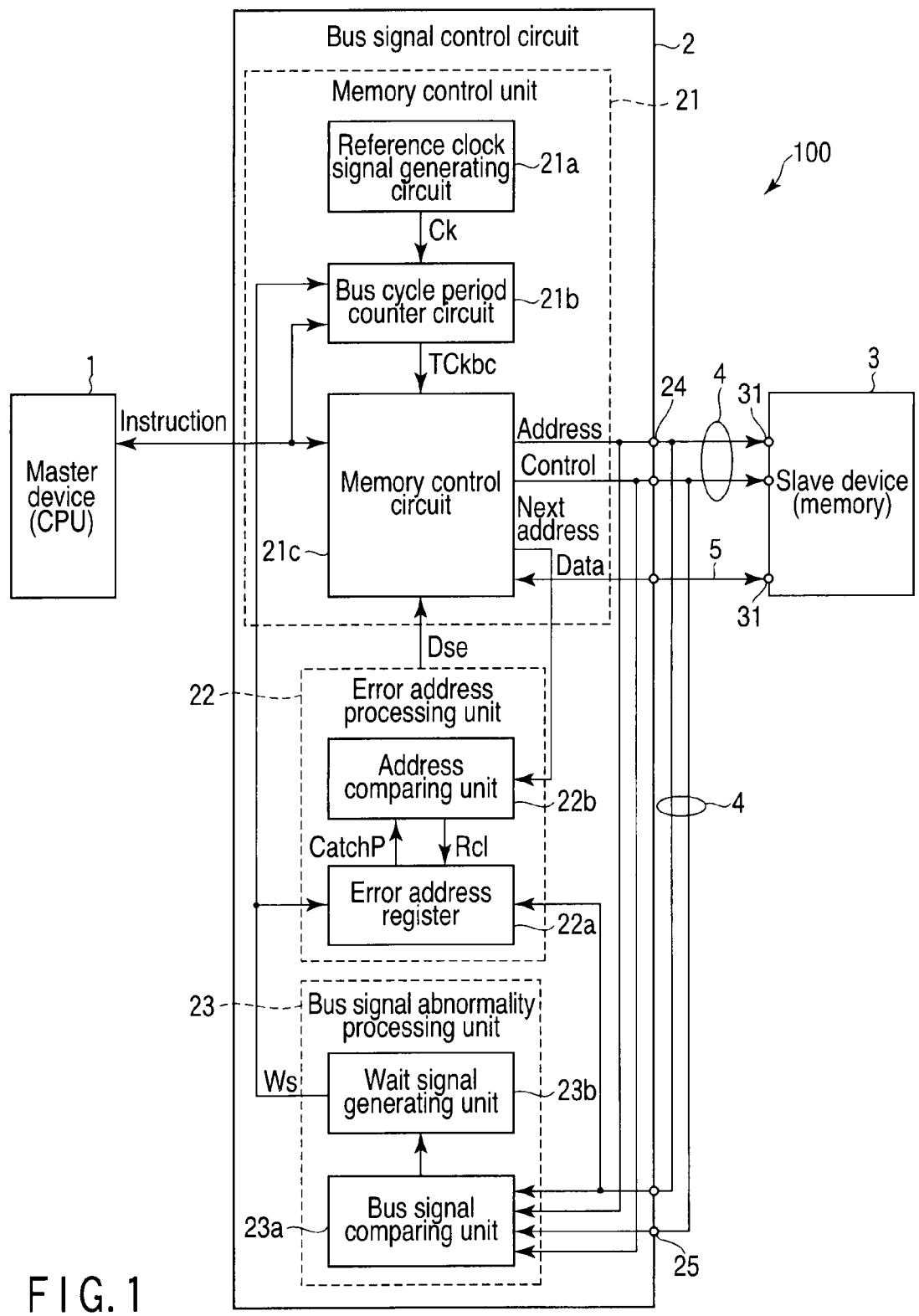
FIG. 1 is a block diagram of a bus signal control circuit according to the present invention.

An embodiment of the present invention will be described below with reference to the drawings. FIG. 1 shows an entire configuration of a signal processing circuit 100 according to the present invention.

The entire configuration will be described first. Thereafter, detailed configurations and operations of units will be described. In this case, a master device 1 is configured by a CPU, and a slave device 3 is configured by one or more memories such as SRAM. A case in which data is written in or read from the slave device 3 through a bus signal control circuit 2 according to the present invention will be described below.

The configuration of the signal processing circuit 100 includes the master device 1 which controls transmission/reception of data, the slave device 3 which stores the data exchanged between the slave device 3 and the master device, and the bus signal control circuit 2 which controls a bus signal output to the slave device 3 according to an instruction from the master device 1.

The bus signal control circuit 2 includes bus diagnosis lines 4, a memory control unit 21, an error address processing unit 22, and a bus signal abnormality processing unit 23. An address line and a control line which connect the bus signal control circuit 2 and the slave device 3 are connected to a receiving terminal 31 of the slave device 3. The bus diagnosis lines 4, as will be described later, are signal lines wired from the receiving terminal 31 to a feedback terminal 25 of the bus signal control circuit 2. A wire extending from the bus signal control circuit 2 to the feedback terminal 25 through the receiving terminal 31 is formed as a "single stroke continuous line". The memory control unit 21 controls data writing or data reading to the slave device 3 under the instruction of the master device 1. The bus signal abnormality processing unit 23 compares an output signal output from the bus signal control circuit 2 to an address line and a control line with a feedback signal fed back to the feedback terminal 25 through the bus diagnosis lines 4 to determine the presence/absence of a difference. When it is determined that the difference is present, the bus signal abnormality processing unit 23 generates a wait signal to elongate a bus cycle period of an operation being executed.

The error address processing unit 22 includes an error address register 22a which temporarily stores error address data obtained at the time when a "difference-present signal" is output from the bus signal abnormality processing unit 23, and an address comparing unit 22b which compares the temporarily stored address with an address of an instruction to be executed next, to generate a signal for deleting, for example, the next instruction so that the error address data is not used.

Configurations of units of the bus signal control circuit 2 according to the present invention will be described below. The memory control unit 21 includes a memory control circuit 21c which controls a bus signal (address signal and control signal) to write data in or read data from the slave device 3 according to an instruction from the master device 1; a reference clock signal generating circuit 21a which generates a reference clock signal Ck of a bus cycle in which the bus signal is transmitted; and a bus cycle period counter circuit 21b which generates a bus cycle signal TCkbc on the basis of the reference clock signal Ck.

The bus signal abnormality processing unit 23 includes a bus signal comparing unit 23a which compares a bus signal output from the bus signal control circuit 2 to the address line and the control line with the feedback signal fed back to the feedback terminal 25 through the bus diagnosis lines 4 to detect the presence/absence of a difference; and a wait signal generating unit 23b which generates a wait signal to elongate a bus cycle period of an operation being executed when the bus signal comparing unit 23a outputs a signal representing the presence of the difference.

The bus diagnosis lines 4 will be described below with reference to FIGS. 2A and 2B. In the signal processing circuit 100 shown in FIGS. 2A and 2B, the master device 1, the bus signal control circuit 2, and the slave device 3 may be mounted on one chip or different printed boards.

The bus diagnosis lines 4 may be a pattern on a chip or wire lines between the circuit boards. For example, when a memory of the slave device 3 is Static Random Access Memory (SRAM), each of the address line (address bus), the control line, and the data line (data bus) includes a large number of lines. The bus diagnosis lines 4 are signal lines extending from the receiving terminal 31 of the slave device 3 to the feedback terminal 25 of the bus signal control circuit 2. The address lines, the control lines, and the bus diagnosis lines 4 are arranged to extend from a transmitting terminal 24 to the feedback terminal 25 through the receiving terminal 31 as a single stroke continuous line. More specifically, the bus diagnosis lines 4 are directly connected to the receiving terminal 31 of the slave device 3 without passing through an address bus or a control signal line.

Signal symbols shown in FIG. 2A denote symbols in a general-purpose SRAM. A signal transmitted through an address line is represented by Add*, and signals on a control line transmitted when data is written in or read from an SRAM are represented by CE1, CE2, R/W, OE, UB, and LB. The symbol added with a bar denotes a negative logic (active low) signal. The control signal R/W denotes a read signal or a write signal. When the signal R/W is at a low level, an active (low level) output enable signal OE represents a read operation, and an inactive (high level) output enable signal represents a write operation.

The respective signals are generally described in a data book of a manufacturer. Parts required to explain the present invention will be described in detail in each case. A signal transmitted from the bus signal control circuit 2 and a feedback signal fed back through the bus diagnosis lines 4 are discriminated from each other by adding FB to the head of the symbol of the feedback signal.

In FIG. 2B, a signal line extending from the transmitting terminal 24 to the receiving terminal 31 is represented by a solid line, and a feedback signal line for a signal returned to the feedback terminal 25 through the receiving terminal 31 is indicated by an alternate long and short dash line. Even though the slave device 3 includes a plurality of memories 3a, 3b, and 3c as shown in FIG. 2B, the signal lines are arranged like a single stroke continuous line, and signal lines for a signal to be transmitted or received are arranged adjacent to each other, so that an external noise is prevented from being easily induced to the bus diagnosis lines 4.

In the present invention, the transmitted signal and the fed back signal are compared with each other by the bus signal abnormality processing unit 23 on the transmission side to determine whether normal transmission is performed.

Figure 3A:
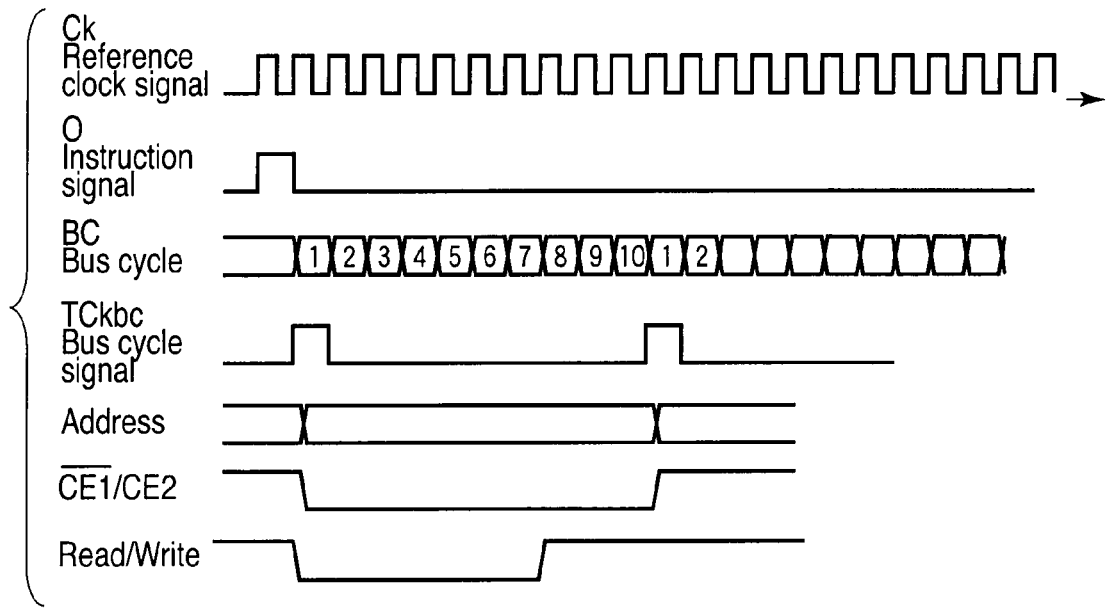
FIGS. 3A and 3B are diagrams for explaining a detection principle of the bus signal control circuit according to the present invention and an operation of the bus signal processing circuit.

A principle of operation of the signal processing circuit according to the present invention having the above configuration will be described below with reference to FIGS. 1 and 3A and 3B. FIG. 3A shows a time chart of a signal generated by the bus signal control circuit 2 according to the present invention.

The bus cycle signal TCkbc indicates a transition of addresses and indicates 10 counts of the reference clock signal Ck as a bus cycle (one access period). This bus cycle is a bus cycle to an instruction signal O of the CPU serving as the master device 1, and is generated in the memory control unit 21.

In this bus cycle, a preset address signal Address and a control signal (in this case, a chip enable signal CEa/CEb and a write or read signal R/W, UB, and LB) are generated depending on a value (value of a bus cycle BC) of the counter circuit 21b.

Figure 3B:
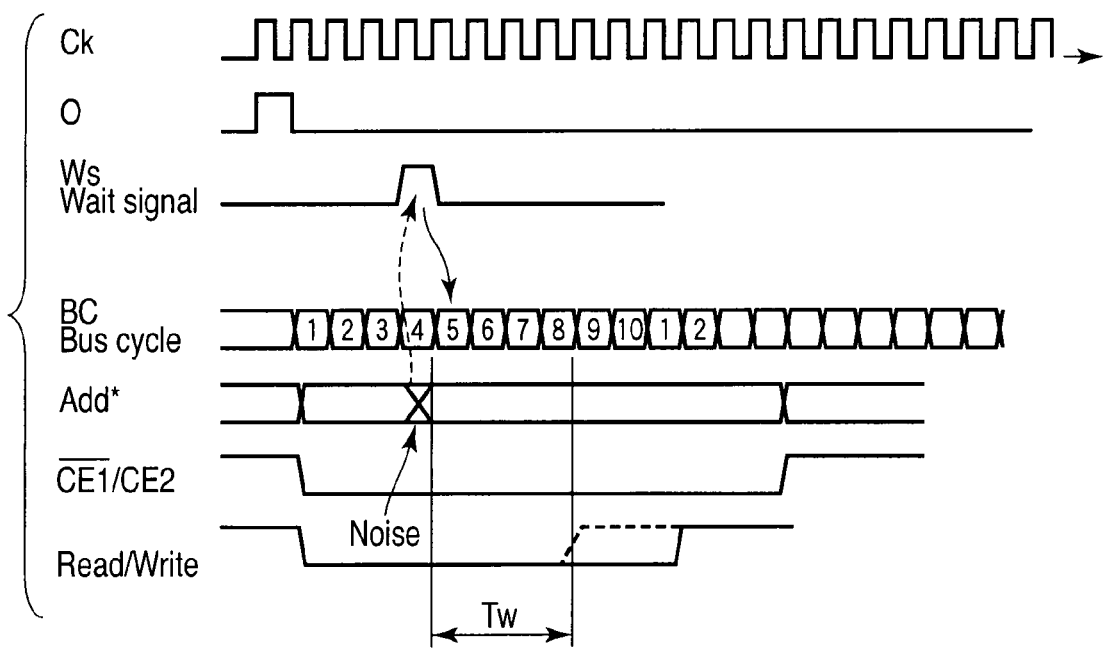

In this case, as shown in FIG. 3B, when a difference between any corresponding bits of the transmitted bus signal (address signal in FIG. 3B) and a fed back bus signal is detected, the bus signal abnormality processing unit 23 generates a wait signal Ws to notify the memory control unit 21 of the wait signal Ws.

At this time, the memory control unit 21 elongates a bus cycle started at a detected timing by a period Tw. A dotted line of the read or write control signal R/W shown in FIG. 3B indicates a normal signal waveform obtained when no noise occurs. In the embodiment, as shown in FIG. 3B, when a noise occurs, rising edge of the read or write control signal R/W is delayed by the period Tw with reference to normal rising edge. For example, in data writing, data on a data bus is written in a memory at rising edge of a write signal W.

More specifically, abnormality of a bus signal is detected on the basis of a difference between a transmitted signal and a signal received by the feedback terminal to elongate the bus cycle. By the elongation of the bus cycle, even though an address error is caused by a noise, data is read or written at a timing at which an address is restored to a correct value.

The bus signal control circuit 2 according to the present invention will be described below in detail. The bus signal abnormality processing unit 23 will be described first with reference to FIGS. 4 to 7, and the error address processing unit 22 will be described next with reference to FIG. 8 and FIGS. 9A and 9B.

Figure 4:
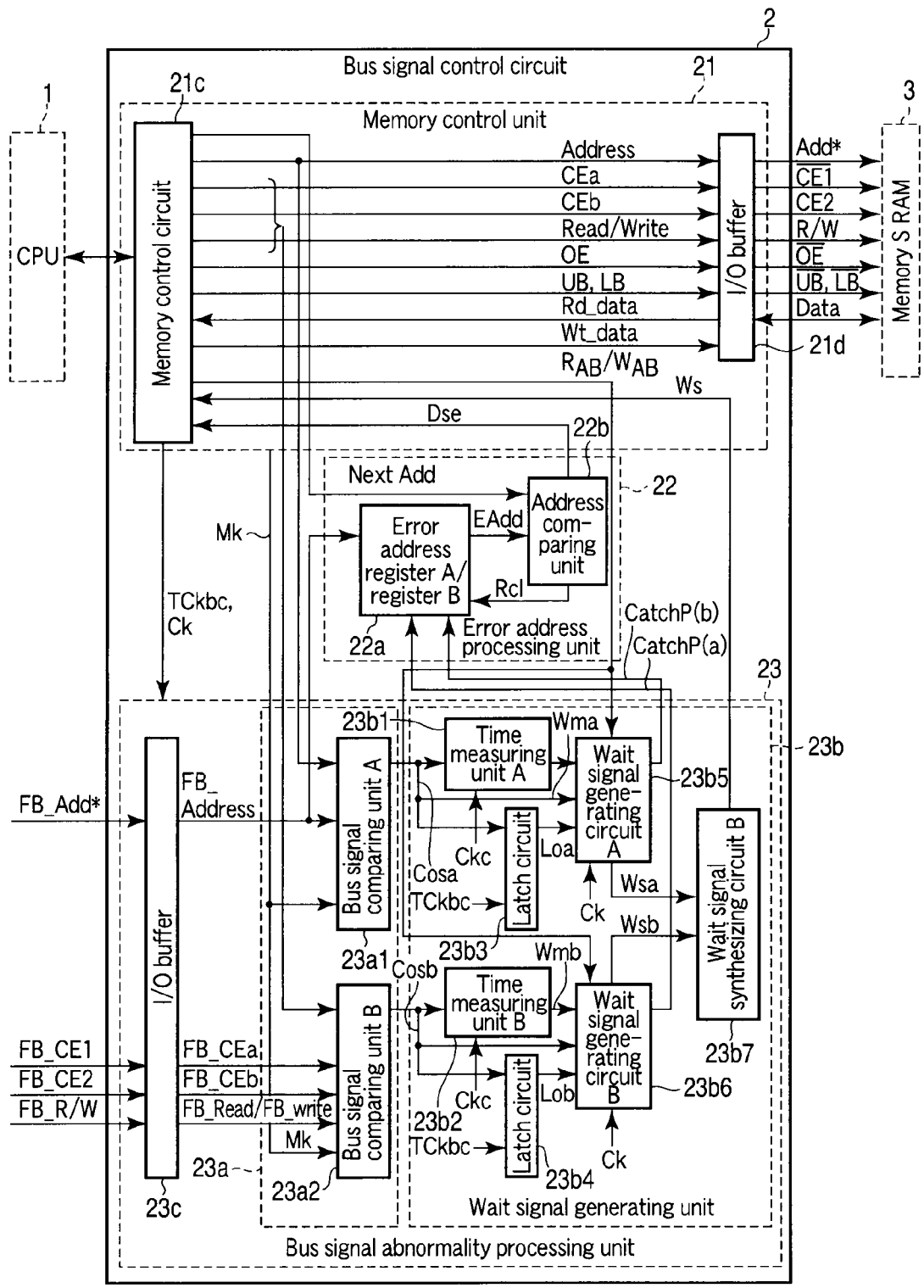
FIG. 4 is a detailed block diagram of the bus signal control circuit according to the present invention.

As shown in FIG. 4, the bus signal abnormality processing unit 23 includes the bus signal comparing unit 23a, the wait signal generating unit 23b, and an I/O buffer 23c. The I/O buffer 23c converts feedback signals FB_Add*, FE_CE1, . . . input through the bus diagnosis lines 4 into signals suitable for the circuits in the chip and outputs the signals as feedback signals FB_Address, FE_CEa, . . . . In general, an electric level of a signal in a chip is different from an electric level of a signal outside the chip (voltage in the chip is lower), and high-active design may be conveniently adopted in the chip. The I/O buffer 23c performs such level conversion and logical conversion. In the embodiment, it is assumed that the logic of a signal in the chip is the same as that of a signal outside the chip.

The bus signal comparing unit 23a compares the address signal Address and the control signals CEa . . . transmitted from the memory control circuit 21c with the feedback address signals FB_Address and the feedback control signals FB_CEa . . . received from the bus diagnosis lines 4 through the I/O buffer 23c, respectively, in correspondence with each other. The bus signal comparing unit 23a outputs the comparison results as Cosa and Cosb. The comparison result Cosa represents whether a difference between address signals is detected, and the comparison result Cosb represents whether a difference between control signals is detected.

The wait signal generating unit 23b measures pulse widths of the comparison results Cosa and Cosb of the bus signal comparing unit 23a. When each of the pulse width is equal to or longer than a preset response time (sensitivity) of the slave device 3, the wait signal generating unit 23b outputs a "difference-present" signal.

Detailed configurations of units of the bus signal abnormality processing unit 23 will be described below.

The bus signal comparing unit 23a includes a bus signal comparing unit A23a1 which detects an address error and a bus signal comparing unit B23a2 which detects an error of a control signal.

The wait signal generating unit 23b includes a time measuring unit 23b1 which measures a pulse width of an output signal from the bus signal comparing unit A23a1, i.e., a difference-present signal (to be referred to as a mismatch pulse signal Cosa hereinafter) indicating an address error; a latch circuit 23b3 which latches the mismatch pulse signal Cosa; and a wait signal generating circuit A23b5 which receives an output signal Wma from the time measuring unit 23b1 and an output signal Loa from the latch circuit 23b3 to generate a wait signal Wsa.

The wait signal generating unit 23b includes a time measuring unit 23b2 which measures a pulse width of an output signal from the bus signal comparing unit B23a2, i.e., a difference-present signal (to be referred to as a mismatch pulse signal Cosb hereinafter) indicating a control error; a latch circuit 23b4 which latch the mismatch pulse signal Cosb; and a wait signal generating circuit B23b6 which receives an output signal Wmb from the time measuring unit 23b2 and an output signal Lob from the latch circuit 23b4 to generate a wait signal Wsb.

Furthermore, the wait signal generating unit 23b includes a wait signal synthesizing circuit 23b7 which synthesizes the wait signals Wsa and Wsb from the wait signal generating circuits 23b5 and 23b6 to generate a wait signal Ws.

An operation of the bus signal abnormality processing unit 23 having the above configuration will be described below with reference to FIGS. 5A and 5B.

Figure 5A:
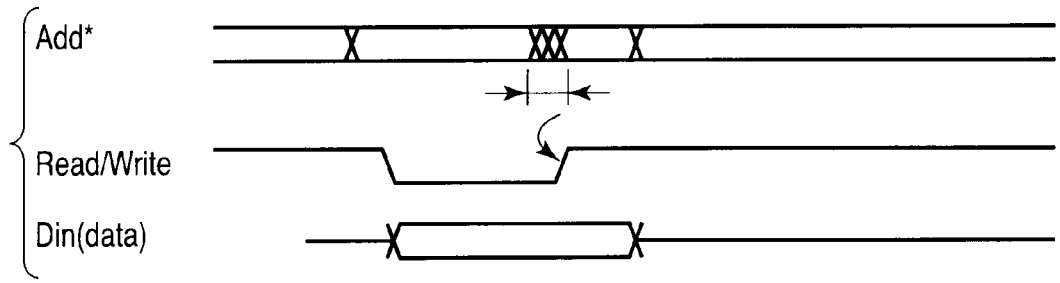
FIGS. 5A and 5B are diagrams for explaining an operation of a bus signal abnormality processing unit according to the present invention.

In general, in a conventional bus signal control circuit, as shown in the time chart of FIG. 5A (however, a control signal such as a chip enable CE which is not required for the explanation of the application is omitted), when a noise is superposed on a transmitted address signal (Add*) of a bus and a write or read signal (R/W) rises, data (Din) obtained at this time is written at an erroneous address (or the data is read from the erroneous address).

According to the configuration of the present invention, in the bus signal comparing unit A23a1, the transmitted address signal Address with the feedback address signal FB_Address are compared. When the signals are different from each other, the mismatch pulse signal Cosa is output. Therefore, as shown in FIG. 5B, when a noise is superposed on the address signal FB_Address (FB_Add*) of the bus diagnosis line 4, the mismatch pulse signal Cosa is output.

Figure 5B:
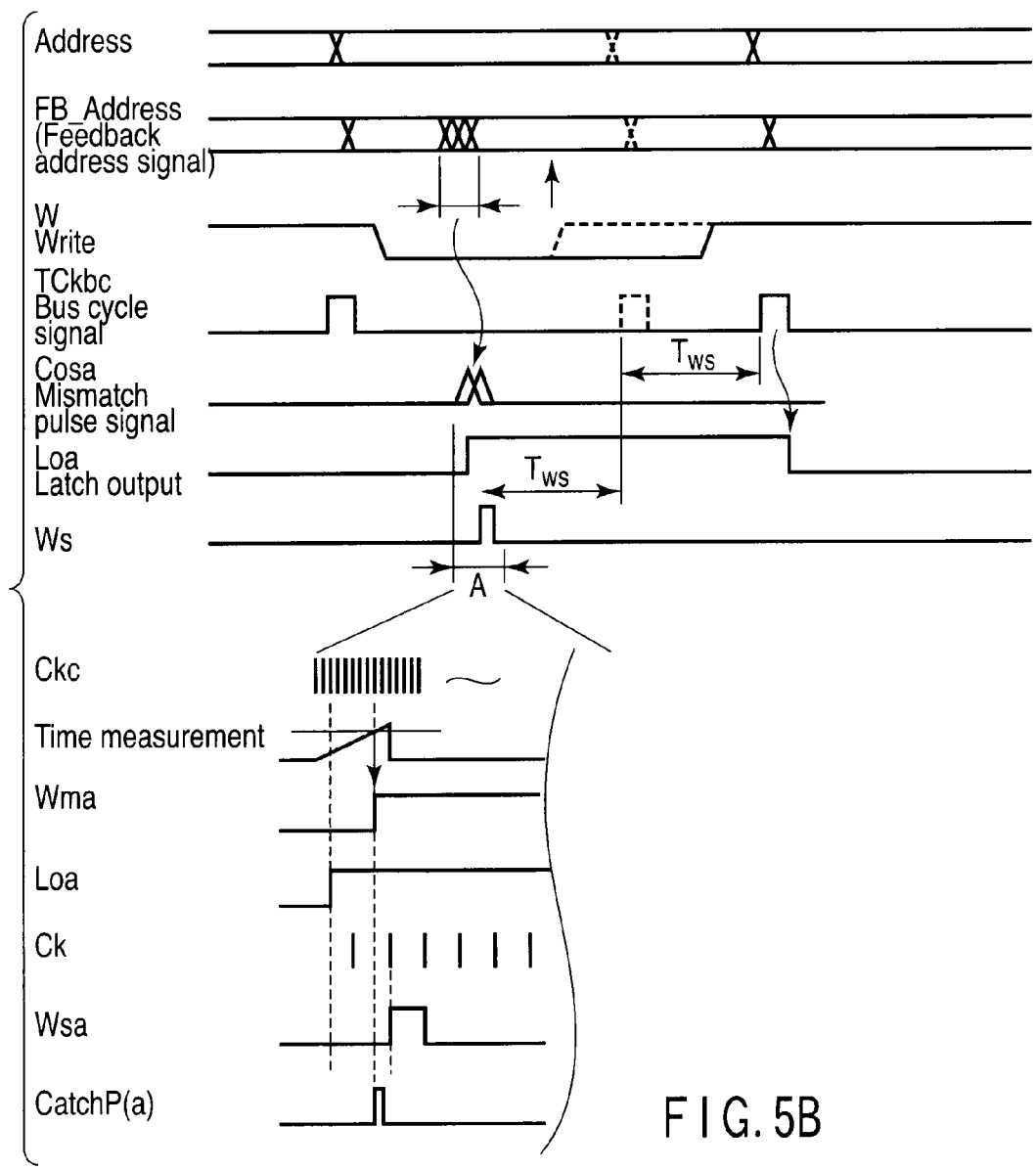

A lower time chart in FIG. 5B shows a magnified operation in a period A immediately after the mismatch pulse signal Cosa is detected.

More specifically, the bus signal comparing unit A23a1 compares the address bus signal Address output from the memory control unit 21 with the address bus signal FB_Address fed back through the bus diagnosis line 4 bit by bit. When mismatch between any one pair of bits in the address bus signals configured by a plurality of bits is detected, the bus signal comparing unit A23a1 outputs the mismatch pulse signal Cosa.

More specifically, since the feedback signal FB_Address is a signal obtained by simply feeding back the Address signal transmitted from the memory control unit 21 through the bus diagnosis line 4, the feedback signal FB_Address has basically the same logic as the signal Address. However, when the comparison result represents mismatch, it may be determined that a noise is mixed in any line of the address bus, and logical level thereof is changed.

Figure 6:
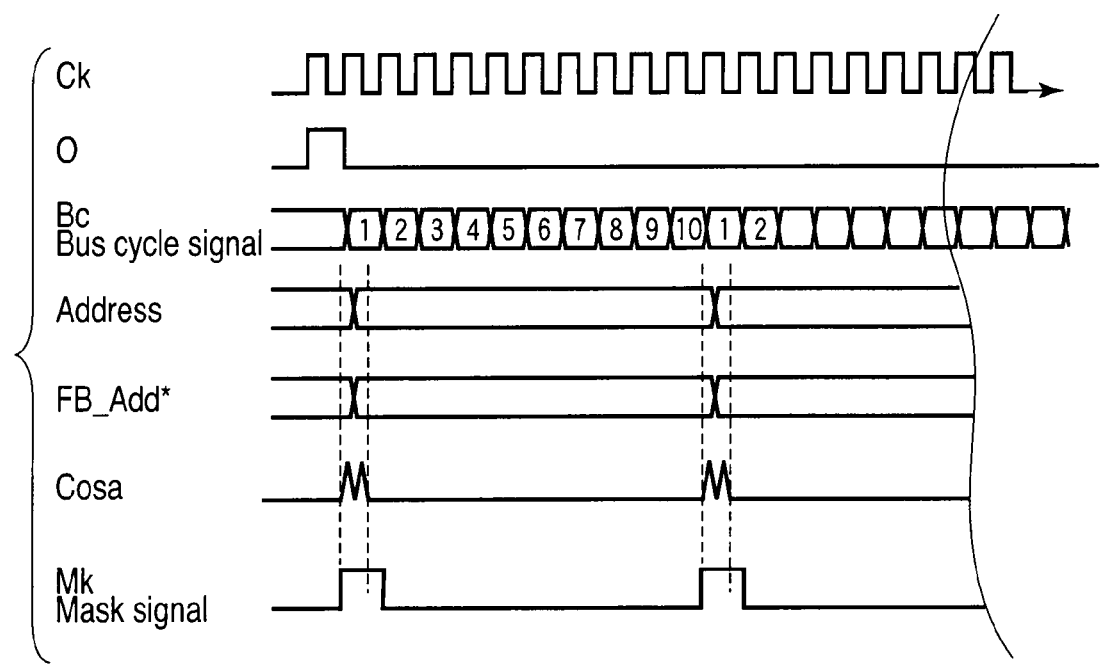
FIG. 6 is a diagram for explaining an operation of a mask signal in the bus signal abnormality processing unit according to the present invention.

In this case, as shown in FIG. 6, since the signal Address and the feedback signal FB_Address are slightly different from each other due to wiring delay, mismatch occurs in an interval in which a pulse of the bus cycle signal TCkbc is generated. Therefore, in a pulse generation period of the bus cycle signal TCkbc generated by the memory control unit 21, a mask signal Mk is input to the bus signal comparing unit 23a from the memory control unit 21, and the corresponding logic operation output is masked.

Returning to the explanation of FIGS. 4 and 5, when the mismatch pulse signal Cosa is output, a time measuring unit A23b1 measures a pulse width of the mismatch pulse signal Cosa to determine whether the pulse width is a predetermined pulse width or more. The latch circuit 23b3 latches the mismatch pulse signal Cosa and outputs the signal as an output Loa.

The outputs Wma and Loa from the time measuring unit A23b1 and the latch circuit 23b3 are reset at a start point of time (falling edge of the bus cycle signal TCkbc) of the bus cycle, and it is determined whether the mismatch pulse signal Cosa is detected in each bus cycle.

The latch circuit 23b3 holds that the mismatch pulse signal Cosa is detected in the period of the bus cycle (output Loa). The time measuring unit A23b1 measures a time in which the mismatch pulse signal Cosa is generated. When the mismatch pulse signal Cosa continues for a predetermined time, i.e., sensitivity (a response time) or longer of the slave device 3, the time measuring unit A23b1 outputs the signal Wma. A clock signal Ckc to measure the pulse time is a signal having a frequency higher than that of the reference clock signal Ck.

The wait signal generating circuit 23b5 outputs the wait signal Wsa (high-level signal) in a period of one cycle of the reference clock signal Ck when the bus cycle is a write cycle ($W_{AB}$: Low) and the output Wma from the time measuring unit A23b1 is generated (Wma: High).

When the bus cycle is a write cycle, and when the output Loa is generated, the wait signal Wsa may be output. However, in order to prevent excessive mismatch detection, a pulse width of the mismatch pulse signal Cosa is measured. When a pulse having a predetermined pulse width or more is generated, mismatch is desirably detected.

The wait signal Wsa is input to the wait signal synthesizing circuit 23b7, and the wait signal Ws is transmitted from the wait signal synthesizing circuit 23b7 to the memory control circuit 21c. The memory control circuit 21c elongates the bus cycle by a period Tws in response to the wait signal Ws.

A detailed operation performed when mismatch is detected in "a control signal" will be described below with reference to FIG. 7. The bus signal abnormality processing unit 23 can also perform error handling with the same configuration as described above even though a noise is superposed on the control signal.

The bus signal abnormality processing unit 23 receives signals CEa (CE1), CEb (CE2), and Write which are control signals output to the slave device 3, signals FB_CEa (FB_CE1), FB_CEb (FB_CE2), and FB_Write (FB_R/W) fed back through the bus diagnosis lines 4, and the bus cycle signal TCkbc representing the start and the end of the bus cycle. Differences between the corresponding signals are detected by the bus signal comparing unit B23a2.

Figure 7:
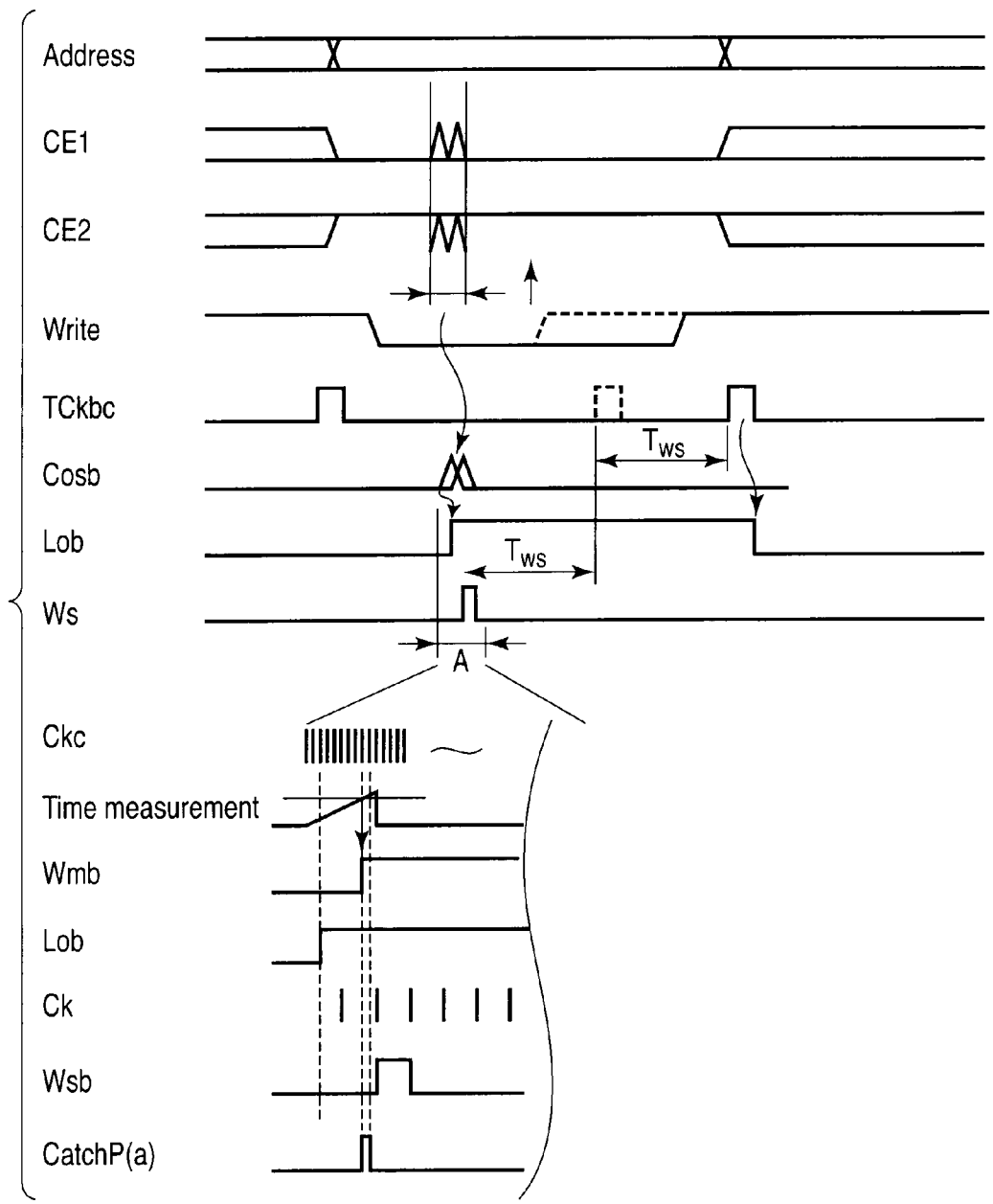
FIG. 7 is a diagram for explaining another operation of the bus signal abnormality processing unit according to the present invention.

FIG. 7 shows a case in which a noise is superposed on chip enable signals CE1 and CE2 in a write cycle. Like the address error, an error of the control signal is detected by the bus signal comparing unit B23a2, and the mismatch pulse signal Cosb is output. The output Wmb from the time measuring unit 23b2 which measures a pulse width of the mismatch pulse signal Cosb and the output Lob from the latch circuit 23b4 are input to the wait signal generating circuit B23b6. In the wait signal generating circuit B23b6, the wait signal Wsb is generated for a period of one cycle of the reference clock signal Ck.

The wait signal Ws from the wait signal synthesizing circuit 23b7 is transmitted to the memory control circuit 21c, and the memory control circuit 21c elongates the bus cycle by a period Tws.

As described above, according to the bus signal abnormality processing unit 23, an address signal transmitted from the memory control unit 21 is compared with an address signal fed back through the bus diagnosis line 4 to detect an address error, and the bus cycle is elongated. Therefore, a frequency of occurrence of an event in which data is written at an erroneous address or an event in which data is read from the erroneous address can be reduced.

As in occurrence of an address error, a frequency of execution of erroneous access caused by superposing a noise or the like on a control signal (chip select CE, read/write signal R/W, UB, or LU) can be reduced.

A mismatch time of the address signal is measured. When the mismatch time is equal to or shorter than a time in which the slave device 3 responds, the bus cycle can be avoided from being unnecessarily elongated because the time measuring unit which neglects the mismatch time is provided.

Figures 9A, 9B:
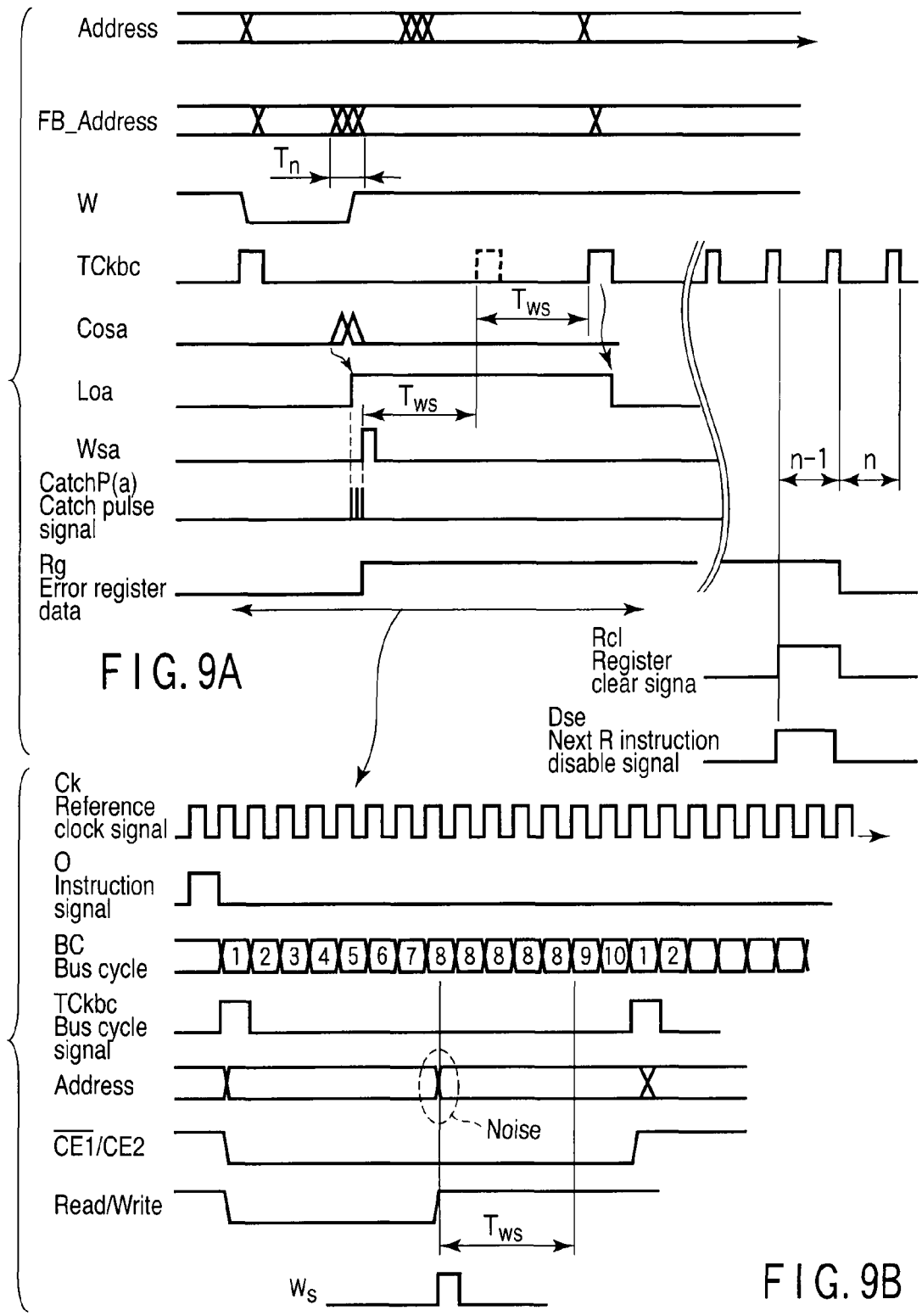
FIGS. 9A and 9B are diagrams for explaining an operation of the error address processing unit according to the present invention.

Details of the error address processing unit 22 will be described below with reference to FIG. 8 and FIGS. 9A and 9B. The error address processing unit 22 includes a function of preventing erroneous data being latently present at the address from being read by the memory control unit 21 when the bus signal abnormality processing unit 23 detects an address error.

The error address processing unit 22 includes the error address register 22a and the address comparing unit 22b which store a plurality of address data when a "difference-present" signal Cosa is generated at the bus signal abnormality processing unit 23.

As shown in FIG. 8, the address comparing unit 22b includes a comparing unit 22b1 and a processing unit 22b2. The comparing unit 22b1 compares address data "next Add" which will be accessed by the memory control unit 21 in the next bus cycle with address data EAdd stored in the error address register 22a and detected in this bus cycle. When the comparing unit 22b1 detects that a write instruction to the same address as the address EAdd is present in the next bus cycle, the processing unit 22b2 generates a clear signal RcI which clears the stored address data EAdd of the error address register 22a. When the processing unit 22b2 detects that a read instruction which read data at the same address as the address EAdd is present, the processing unit 22b2 generates a "next read instruction Dse" signal which deletes the read signal.

Prior to an explanation of a detailed operation of the error address processing unit 22 having the above configuration, the wait signal generating unit 23b which generates a catch pulse signal CatchP to write data in the error address register 22a will be described below with reference to FIG. 4.

The wait signal generating unit 23b includes the wait signal generating circuit A23b5 which generates a catch pulse signal CatchP(a) from the address error and a wait signal generating circuit A23b6 which generates a catch pulse signal CatchP(b) from the control signal error.

Since all the operations are similar to each other, an operation of the wait signal generating circuit 23b5 performed when an address error is detected will be described below with reference to FIG. 4 and the time charts in FIGS. 9A and 9B again. FIGS. 9A and 9B show a case in which a noise is detected in the address signal FB_Adress in a period near a rising edge of the write signal W and the write signal W rises before generation of the wait signal Wsa. In this case, data may be written at an erroneous address of the slave device (SRAM) 3.

The wait signal generating circuit 23b5 receives, from the memory control unit 21, a read/write cycle signal $R_{AB}/W_{AB}$, the reference clock signal Ck, the output Wma from the time measuring unit 23b1, the output Loa from the latch circuit 23b3, and the mismatch pulse signal Cosa of the bus signal comparing unit A23a1. The read/write cycle signal $R_{AB}/W_{AB}$ represents whether the bus cycle is a write cycle or a read cycle, and is a signal which does not change in one bus cycle. The mismatch pulse signal Cosa basically directly passes through the wait generating circuit A23b5 and is output as the signal CatchP(a).

When the bus signal comparing unit A23a1 detects mismatch between the address signal Address and the feedback address signal FB_Address, the bus signal comparing unit A23a1 outputs the mismatch signal Cosa. Since the signal FB_Address is a signal transmitted by the address bus including a plurality of signal lines, burst noises may be superposed on a plurality of address lines at slightly different timings. In this case, as shown in FIG. 9A, a plurality of mismatch pulse signals Cosa are generated. Therefore, the wait signal generating circuit 23b5, as shown in FIG. 9A, outputs a plurality of catch pulse signals CatchP(a).

At this time, the FB_Address input to the bus signal comparing unit A23a1 is written in an error address register A22a in response to the signal CatchP(a). In this example, since a plurality of catch pulse signals CatchP are output, a plurality of error addresses are stored in the error address register A22a.

A configuration and an operation of the error address processing unit 22 will be described in detail.

The error address register 22a includes a plurality of registers. The error address register 22a receives the signal FB_Address, the catch pulse signal CatchP(a), and the clear signal RcI and stores the value of the signal FB_Address at, for example, a rising edge of the catch pulse signal CatchP(a). The error address register 22a resets the contents of a designated register by the clear signal RcI as shown in the time chart in FIG. 9A.

After the catch pulse signal CatchP(a) from the wait signal generating circuit A23b5 is received at the error address processing unit 22, the address comparing unit 22b receives address data "next Add" used when the memory control unit 21 performs access in a next bus cycle n-1. The address comparing unit 22b receives a "next $R_{AB}/W_{AB}$ signal" representing read access or write access performed by the memory control unit 21 in the next bus cycle and one or more error address values EAdd output from the error address register 22a.

The address comparing unit 22b compares the "next Add" with one or more error address values EAdd. When the next Add is matched with any one of the error address values EAdd, and when the next access cycle is read access, the address comparing unit 22b outputs a next instruction read disable signal Dse as shown in the time chart in FIG. 9A to the memory control unit 21. When the next Add is matched with any one of the error address values, and when the next access cycle is write access, the address comparing unit 22b outputs the clear signal Rcl as shown in the time chart in FIG. 9A to the error address register 22a.

Therefore, when write access is performed to the same address as an error address stored in the error address register 22a, latent error data is updated by correct write access. At this time, the address comparing unit 22b resets (erases) corresponding error address information stored in the error address register 22a.

When read access is performed to the same address as one of the plurality of addresses stored in the error address register 22a, the address comparing unit 22b notifies the memory control unit 21 that latent error data may be read. In this case, a host (program, administrator, or the like) may stop the system without executing a read operation, may perform a read operation and discard the read data, or may directly use the read data.

Since the master device 1 and the slave device 3 have different layout spaces, is it supposed that an address stored in the error address register 22a is different from an address actually input to the slave device 3.

For this reason, an error address determining unit (not shown) which notifies the memory control unit 21 of that "next Add" having logic of bits close to logic of bits of the stored error address is suspicious, may be arranged. With the above configuration, when an address which is bit-logically close to the address value stored in the error address register 22a is accessed, an alarm can also be output to read of latent error data.

The present invention is not limited to the above embodiment, and various modifications of the invention can be effected without departing from the spirit and scope of the invention. For example, the slave device is not limited to an SRAM, and a DRAM which elongates a bus cycle may be used. Depending on the scales and sizes of the master device and the slave device and the response speeds of the devices, optimum bus diagnosis lines are desirably arranged.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bus signal control circuit which is connected between a master device which controls transmission or reception of data and a slave device which stores the data, is connected to the slave device through an address bus and a control signal line, and controls a bus signal transmitted or received through the address bus and the control signal line, comprising:
    a bus diagnosis line which is directly connected to a bus signal receiving terminal of the slave device without passing through the address bus and the control signal line;
    a memory control unit which controls writing and reading of data to the slave device according to an instruction from the master device; and
    a bus signal abnormality processing unit which compares an output bus signal output from the bus signal control circuit to the address bus and the control signal line with a feedback bus signal fed back through the bus diagnosis line to determine the presence/absence of a difference, wherein
    the memory control unit elongates a bus cycle period of an operation being executed when it is determined in the bus signal abnormality processing unit that the difference is present, and
    the bus signal abnormality processing unit further comprises:
    a first bus signal comparing unit which compares an address signal transmitted from the memory control unit with a feedback address signal fed back through the bus diagnosis line to determine whether a difference is present;
    a second bus signal comparing unit which compares a control signal transmitted from the memory control unit with a feedback control signal fed back through the bus diagnosis line to determine whether a difference is present; and
    a signal generating circuit which measures a time of a period in which it is determined in one of the first and second bus signal comparing units that a difference is present and generates a difference-present signal Ws when the period in which the difference is present is not less than a response time of the slave device.

2. A bus signal control circuit which is connected between a master device which controls transmission or reception of data and a slave device which stores the data, connected to the slave device through an address bus and a control signal line, and controls a bus signal transmitted or received through the address bus and the control signal line, comprising:
    a bus diagnosis line which is directly connected to a bus signal receiving terminal of the slave device without passing through the address bus and the control signal line;
    a memory control unit which controls writing and reading of data to the slave device according to an instruction from the master device;
    a bus signal abnormality processing unit which compares an output bus signal output from the bus signal control circuit to the address bus and the control signal line with a feedback bus signal fed back through the bus diagnosis line to determine the presence/absence of a difference, wherein the memory control unit elongates a bus cycle period of an operation being executed when it is determined in the bus signal abnormality processing unit that the difference is present, and
    an error address processing unit, wherein the error address processing unit further comprises:
    an error address register which, when the bus signal abnormality processing unit detects the difference, stores a feedback address obtained at this time as a first address; and
    an address comparing unit which compares a second address which is accessed by the memory control unit in a next bus cycle with the stored first address, when the first and second addresses are matched with each other, instructs the memory control unit to clear the stored first address when the next bus cycle is a write cycle and, when the next bus cycle is a read cycle, instructs the memory control unit to make the read cycle disable.

3. The control circuit according to claim 2, wherein the error address processing unit includes an error address data determining unit which determines whether a bit logic of the second address is similar to a bit logic of the first address stored in the error address register and, when the bit logics are similar to each other, gives a warning to the memory control unit.

* * * * *